US008946918B1

(12) United States Patent
Natarius

(10) Patent No.: US 8,946,918 B1
(45) Date of Patent: Feb. 3, 2015

(54) MODULAR IN-CONDUIT GENERATOR FOR HARNESSING ENERGY FROM CIRCUMFERENTIAL FLOW

(75) Inventor: Eugene M. Natarius, St. Paul, MN (US)

(73) Assignee: Vortex Flow, Inc., St. Paul, MN (US)

( * ) Notice: Subject to any disclaimer, the term of this patent is extended or adjusted under 35 U.S.C. 154(b) by 0 days.

(21) Appl. No.: 13/020,768

(22) Filed: Feb. 3, 2011

Related U.S. Application Data

(60) Provisional application No. 61/301,043, filed on Feb. 3, 2010.

(51) Int. Cl.
*H02K 7/18* (2006.01)

(52) U.S. Cl.
USPC ............................................................ 290/52

(58) Field of Classification Search
USPC .................................................. 290/52, 54
See application file for complete search history.

(56) References Cited

U.S. PATENT DOCUMENTS

| | | | |
|---|---|---|---|
| 4,246,753 A | 1/1981 | Redmond | |
| 4,272,686 A | 6/1981 | Suzuki | |
| 4,352,025 A | 9/1982 | Troyen | |
| 4,731,545 A | 3/1988 | Lerner et al. | |
| 6,419,843 B1 | 7/2002 | Natarius | |
| 7,190,088 B2 | 3/2007 | Heidel | |
| RE40,407 E | 7/2008 | Natarius | |
| 7,429,803 B2 | 9/2008 | Davis | |
| 7,501,712 B2 | 3/2009 | Bolyard | |
| 7,632,040 B2 | 12/2009 | Cripps | |
| 7,802,942 B2 | 9/2010 | Cripps | |
| 2007/0241567 A1* | 10/2007 | Platt | 290/55 |
| 2008/0238099 A1 | 10/2008 | Ziegenfuss | |
| 2008/0238105 A1* | 10/2008 | Ortiz et al. | 290/54 |
| 2008/0258694 A1 | 10/2008 | Quist | |
| 2009/0230687 A1 | 9/2009 | Robichaud | |
| 2010/0084862 A1 | 4/2010 | Unno | |
| 2010/0096857 A1* | 4/2010 | Miller et al. | 290/52 |
| 2010/0187829 A1 | 7/2010 | Douglas | |

FOREIGN PATENT DOCUMENTS

WO WO2009020474 2/2009

* cited by examiner

*Primary Examiner* — Tulsidas C Patel
*Assistant Examiner* — Sean Gugger
(74) *Attorney, Agent, or Firm* — Patterson Thuente Pedersen, P.A.

(57) ABSTRACT

An electrical generator module for harnessing the energy of fluid flowing in a channel subject to gravitational and centripetal forces. The electrical generator module includes a stationary casing portion and a runner portion rotationally coupled to the stationary casing portion, with the runner portion including a set of blades adapted to interact with the fluid. A support arrangement is adapted to secure the stationary casing portion to the interior of the channel in place such that it is prevented from rotating. An electrical energy generator is mechanically coupled to the runner portion and adapted to convert rotational motion of the runner portion into electrical energy.

11 Claims, 10 Drawing Sheets

FIG.1
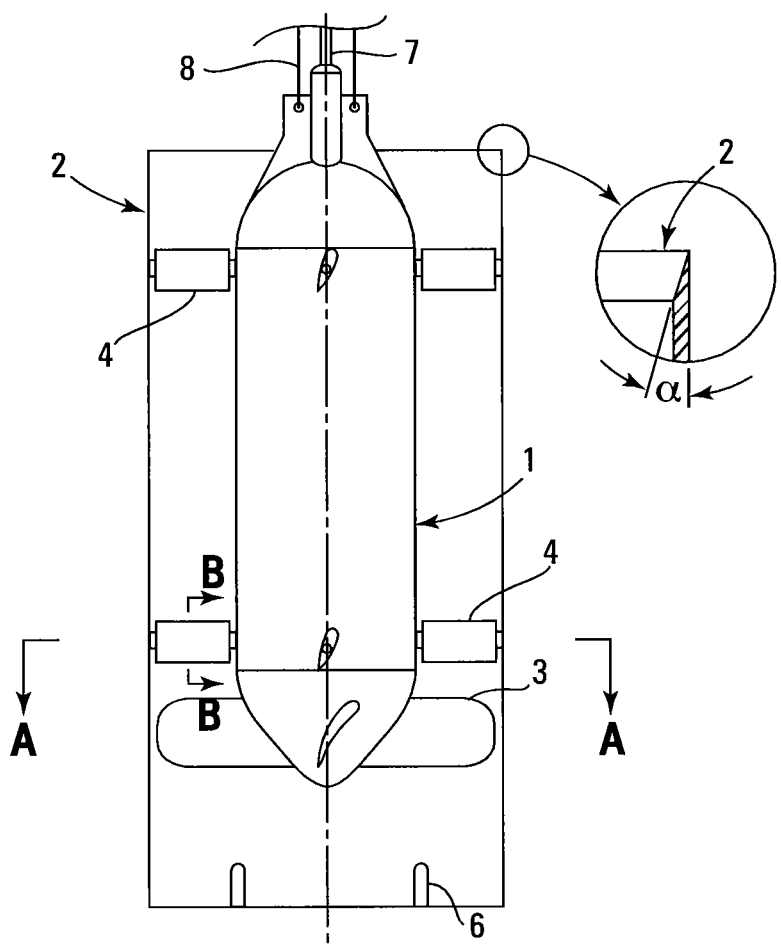
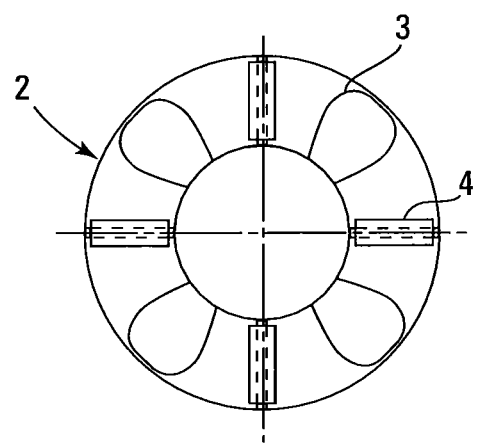
FIG.1A

MODULAR IN-CONDUIT GENERATOR FOR HARNESSING ENERGY FROM CIRCUMFERENTIAL FLOW

PRIOR APPLICATION

This Application claims the benefit of U.S. Provisional Application No. 61/301,043 filed Feb. 3, 2010, which is incorporated by references herein in its entirety.

FIELD OF THE INVENTION

The invention relates generally to generation of electricity and, more particularly, to apparatus and methods for generating electricity from fluid flowing in a circumferential or helical path along an interior wall of a flow conduit.

BACKGROUND OF THE INVENTION

Wastewater conveyance systems have been essential to the health and prosperity of our society. Throughout past decades, sewers have been utilized to efficiently transport wastewater, or sewage, from homes and businesses where it was generated, to wastewater treatment plants, which use various processes to transform the wastewater into an environmentally-safe fluid waste stream and a solid waste suitable for disposal or reuse. Similarly, stormwater conveyance systems are used to transport surface runoff to suitable discharge points into the environment. Modern or modernized water systems have separate sewage and storm conveyance systems, while older systems sometimes have combined sewage and stormwater conveyance systems, which deliver these waters to a treatment plant.

Wastewater and stormwater carried from homes and businesses eventually enters a large pipe called an interceptor, which carries the flow to a treatment plant or discharge point. The interceptor is generally located at the lowest possible elevation so that gravity, can be utilized as much as possible to move the massive volumes of water.

Turbulence in wastewater flow is a main cause of odorous and corrosive gas emission and abrasive wear of the underground conveyance structures. Engineers are therefore careful to design the conveyance network so that under various conditions the flow within the pipes remains tranquil, without turbulence. Typical design guidelines call for less than 1% slope to keep the velocity and turbulence in pipelines low, and gas emissions and abrasive wear to a minimum. Practically, however, terrain is not flat and turbulence cannot be eliminated from the network. To avoid steep slopes or very deep and expensive excavation, sewer drops are inevitable. The drops themselves are essentially waterfalls within a vertical well or structure. Drops are inherently turbulent, but are still preferred over sloped piping because they concentrate the turbulence at one point, rather than over miles of steeply-sloped piping. Every sewer drop is thus a selected point of flow energy release, and consequently, a source of odor and corrosion, and mechanical wear of the conveyance system.

One approach for dealing with the adverse consequences of flow drops has been proposed in U.S. Pat. No. RE40,407, incorporated by reference herein. U.S. Pat. No. RE40,407 describes a vortex drop structure and technique for conveying flow from a higher elevation to a lower elevation by accelerating and redirecting the flow into a generally helically-spiraling path along an interior wall of a vortex shaft. Typically, the vortex shaft is has a generally-circular cross-section and is situated generally vertically, (although the device may function in other non-vertical orientations, including in a horizontal orientation). In a properly-designed vortex drop structure, the flow spirals downward inside of the vortex shaft while under the influence of centripetal forces; therefore, the flow tends to maintain intimate contact with the interior wall of the vortex shaft. Under these conditions, in the center of the vortex shaft's cross section (for at least the majority of the height of the flow drop) is a stable air core, even when the vortex drop structure is conveying flow at its design flow capacity. In certain exceptional situations, the vortex shaft may work without an air core.

In wastewater or stormwater conveyance systems, the flow created by the vortex drop structure provides a number of benefits, including protecting the life of the drop structure by virtually eliminating abrasion and dissipating energy, controlling emissions of odors by dragging ambient air downwards with the flow, and even improving the characteristics of the wastewater or stormwater by aerating it using the dragged-down air. However, vortex drop structures may be used in industrial processes, and elsewhere, wherever an energetic flow needs to have its kinetic energy dissipated.

It has been proposed to utilize the vortex drop structure and its well-controlled flow characteristics to generate electrical energy. The energy which may be dissipated in sewer and stormwater collection system flow drops, and elsewhere, can collectively produce substantial amounts of energy, which in turn may be used to power industrial processes or simply feed into the electrical grid for general use by power company customers.

Although the concept of generating power using vortex drop structures is a promising one, to date, an efficient an effective solution for power generation using vortex drops has not been proposed. Accordingly, a need exists for a practical power generation solution.

SUMMARY OF THE INVENTION

One aspect of the invention is directed to an electrical generator module for use with a vortex drop structure. The vortex drop structure is constructed to direct a fluid flow into a generally helical flow path along an interior wall of a vortex shaft, with the helical flow path defining an air core in the center of the helical flow. The electrical generator module comprises a stationary casing portion, and a runner portion rotationally coupled to the stationary casing portion and including a set of blades adapted to interact with the generally helical fluid flow. A support arrangement is adapted to hold the stationary casing portion in the interior of the vortex shaft at a fixed position along the length of the vortex shaft. An electrical energy generator is mechanically coupled to the runner portion and adapted to convert rotational motion of the runner portion into electrical energy. The stationary casing portion is constructed to have a form factor such that, in operation, the casing portion presents at most an insubstantial obstruction to fluid flow in the helical flow path.

According to another aspect of the invention, an electrical generator module for harnessing the energy of fluid flowing in a channel subject to gravitational and centripetal forces is provided. The electrical generator module includes a cylindrical shell portion, a stationary casing portion rigidly secured to the cylindrical shell portion, and a runner portion rotationally coupled to the stationary casing portion, with the runner portion including a set of blades adapted to interact with the fluid. A support arrangement is adapted to secure the cylindrical shell portion to the interior of the channel such that the cylindrical shell portion is prevented from rotating, and an electrical energy generator is mechanically coupled to the runner portion and adapted to convert rotational motion of the runner portion into electrical energy.

Embodiments of the present invention provide a practical electricity generator module for use with vortex drop structures, and other similar arrangements in which the flow has a circumferential component. A number of additional features which may optionally form a part of the invention are disclosed herein. Certain embodiments provide modules that are simple to install in the field, that can be removed, serviced, and re-installed, if such service is needed (without having to disassemble the vortex drop structure in some circumstances), and that can be retrofitted into existing vortex drop structures. Additional benefits will become apparent from the detailed description that follows.

BRIEF DESCRIPTION OF THE DRAWINGS

The invention may be more completely understood in consideration of the following detailed description of various embodiments of the invention in connection with the accompanying drawings, in which:

FIG. 1 is a front elevational view of an electrical generator module according to one embodiment, and includes a detail view of a corner of the cylindrical shell portion of the module.

FIG. 1A is a cross-sectional view of the module depicted in FIG. 1.

Figure 1B:
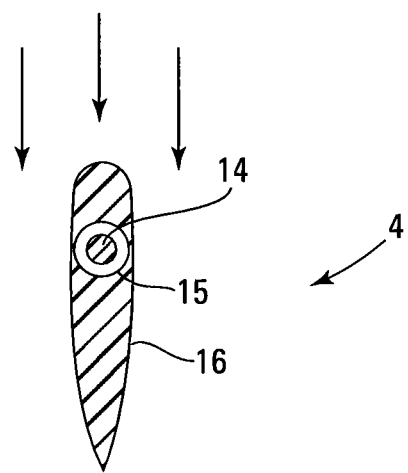
FIG. 1B is a cross-sectional view of a stay vane used with the module depicted in FIG. 1 according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention disclosed herein and defined by the claims.

DETAILED DESCRIPTION OF THE PREFERRED EMBODIMENTS

FIGS. 1 and 1A are side view and top cross-sectional view diagrams, respectively, illustrating an electrical generator module according to one embodiment. The module includes a turbine that contains an electrical generator device having a stator and a rotor (neither of which is shown) housed by turbine casing 1. In one type of implementation, the turbine is a type of bulb turbine. The stator and the rotor are parts of a conventional electrical generator, and can be of any suitable design so long as they fit within the form factor of turbine casing 1. The stator is mounted to the interior of turbine casing 1, and the rotor is coupled to runner 3 of the turbine.

Turbine casing 1 is sized and shaped to fit mostly in the air core of the vortex shaft (as it would exist at the design flow of the vortex drop structure). In other words, the form factor of turbine casing 1 according to this embodiment allows it to be situated such that turbine casing 1 presents little-to-no substantial obstruction to the helically-spiraling flow. An insubstantial obstruction for purposes of this aspect of the invention ranges from presenting no obstruction at all (the ideal case) to presenting an obstruction which causes a quantifiable loss of efficiency of not more than 25% compared to the zero obstruction case (the quantifiable loss of efficiency being determined for the condition where the vortex drop structure is operating at its maximum design capacity). Of course, most of the time, the vortex drop structure operates with flows smaller than its design capacity, so significantly less obstruction (and greater efficiencies) will be realized.

Runner 3 includes a set of propeller-shaped blades. In an operational configuration, the propeller-shaped blades are angled to provide maximum energy transfer from the helically-spiraling flow in the vortex shaft to the generator. In one type of implementation, the propeller blades have an adjustable angle so that the runner 3 can be used in different vortex drop structure designs, which may have different slopes of the helical flow. The adjustable propeller blades can be set to a suitable angle based on the known design of the drop structure in which the electrical energy generator module is to be installed.

In a related embodiment, the propeller blades can be adjusted while the turbine is operating by a positioning control system, which operates to maximize the efficiency of the electrical generation. In one such embodiment, the positioning control system receives as an input the volumetric flow rate of the influent flow entering the vortex drop structure, and operates to adjust the propeller blade positioning accordingly. In another embodiment, the input to the positioning control system is the electrical power being generated, with the positioning control system operating to seek out a position for the propeller blades to as to achieve a maximum output power.

The electrical generator module further includes cylindrical shell 2 that is rigidly secured to turbine body 1, and serves as a mounting interface between the turbine and the vortex shaft. The cylindrical shell 2 can be made from a pipe section, or from a sheet of material formed into a cylindrical shape. A variety of suitable materials can be used to form the cylindrical shell including, but not limited to, plastics (e.g., PVC, HDPE, etc.), metal (e.g., stainless steel, aluminum, etc.), composite materials, or any combination thereof. In the embodiment depicted in FIG. 1, the top edge of cylindrical shell 2 is beveled such that the edge is made sharp (i.e., $\alpha<15°$). Thus, the cylindrical shell presents only a marginal impediment to the helically-spiraling flow in the vortex shaft.

Turbine casing 1 is coupled to cylindrical shell 2 with stay vanes 4. Stay vanes 4 are shaped and angled in such a way as to present minimal impediment to the helically-spiraling flow. In this regard, stay vanes 4 differ from conventional stay vanes/wicket gate configurations of conventional bulb or Kaplan turbine designs, in which conventional stay vanes and wicket gates serve a function of changing the direction of flow so as to maximize the energy transfer. In those conventional designs, the flow is axial, whereas in the vortex shaft, the helical spiraling flow comes in circumferentially, that is, with a radial component. Thus, the function of stay vanes 4, according to one embodiment, is to support the turbine, and to stay out of the way (i.e., provide a minimum obstruction to the flow). In a an alternative embodiment, the stay vanes perform a flow redirection function as in conventional bulb turbine designs.

FIG. 1B is a cross-sectional view of a stay vane 4 according to one embodiment. In this embodiment, the stay vane is situated around a structural support rod 14, which attaches the turbine casing 1 to the cylindrical shell 2. The stay vane fin 16 is pivotably coupled to support rod 14 via a pivoting bearing 15 at a point near the leading edge of the stay vane. Accordingly, the stay vane is able to pivot in response to the incident flow (depicted with the arrows) so as to present a minimal obstruction to the flow.

In an alternative embodiment, stay vane 4 is mounted at a fixed position based on a predetermined angle that takes into account the vortex drop structure design and the design of runner 3. The fixed position of this embodiment is based on the nominal angle of the helically-spiraling flow specific to the vortex drop structure. In this case, the propeller of runner 3 is angled to produce the maximum output based on the angle of the flow incident on the propeller.

Shell cutouts 6 in cylindrical shell 2 are formed to each receive a structural support member (such as a bolt or bracket, for instance) which protrudes from the interior surface of the vortex shaft. The shell cutouts and structural support members engage when the electrical generator module is installed into a vortex shaft. Engagement of shell cutouts 6 and the structural support members provides lateral and torsional support for cylindrical shell 2. The shell cutouts 6 and structural support members may be used in one embodiment to position the electrical generator module at the appropriate location along the length of the vortex shaft.

In one example, an optimal location in the vortex shaft is the point just before the air core of the helical flow collapses. At this optimal point, the flow is more energetic than at higher points by virtue of having acquired kinetic energy from the vertical drop; additionally, the flow at this point is still organized (i.e., has a wall-hugging profile), which allows for more efficient capture of the flow's energy using the runner's blades.

In a related embodiment, the shell cutouts 6 and matching structural support members are designed to bear some or all of the weight of the generator module. In another embodiment, the shell cutouts 6 and structural support members function to prevent cylindrical shell 2 from rotating inside the vortex shaft during operation of the vortex drop structure.

Lifting cables 8 are attached to the top of the electrical generator module and are used during installation or removal of the module to lower it into the vortex shaft. In embodiments where shell cutouts 6 and structural support members are not meant to support the weight of the generator module, lifting cables 7 may be secured at or near the top of the vortex drop structure, or to a support beam installed in the greater structure as a permanent means of axially supporting the electrical generator at its operational position.

Electrical cabling 7 connects the electrical terminals of the generator to an electrical load, such as a power grid.

Figure 2:
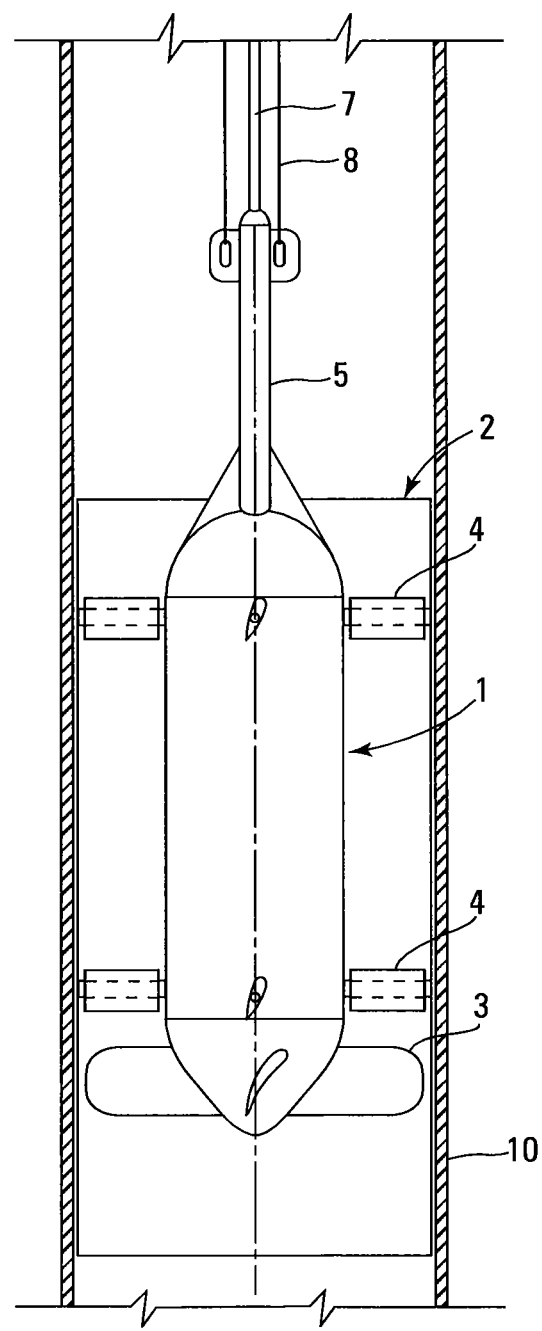
FIG. 2 is an elevational view diagram of an electrical generator module according to another embodiment as installed in a vortex shaft.

Turning now to FIG. 2, an electrical generator module according to another embodiment is depicted installed in a vortex shaft 10. The embodiment of FIG. 2 includes a support pole 5 that attaches the turbine casing 1 to the lifting cables 7. The support pole 5 can provide an additional function of enclosing and protecting electrical cabling 7.

In another type of embodiment, support pole 5 facilitates insertion, removal, and fixation of the turbine. In this embodiment, support pole 5 extends up above the vortex form and is fixed there to the structure, thereby preventing the turbine's axial and rotational movement during operation. Support pole 5 used in this manner may eliminate the need for cutouts 6 or other structural members, which may not be feasible to retrofit into existing operational units. The extended support pole 5 may thus provide a more practical way of keeping the turbine in the shaft in fixed position.

Figure 3:
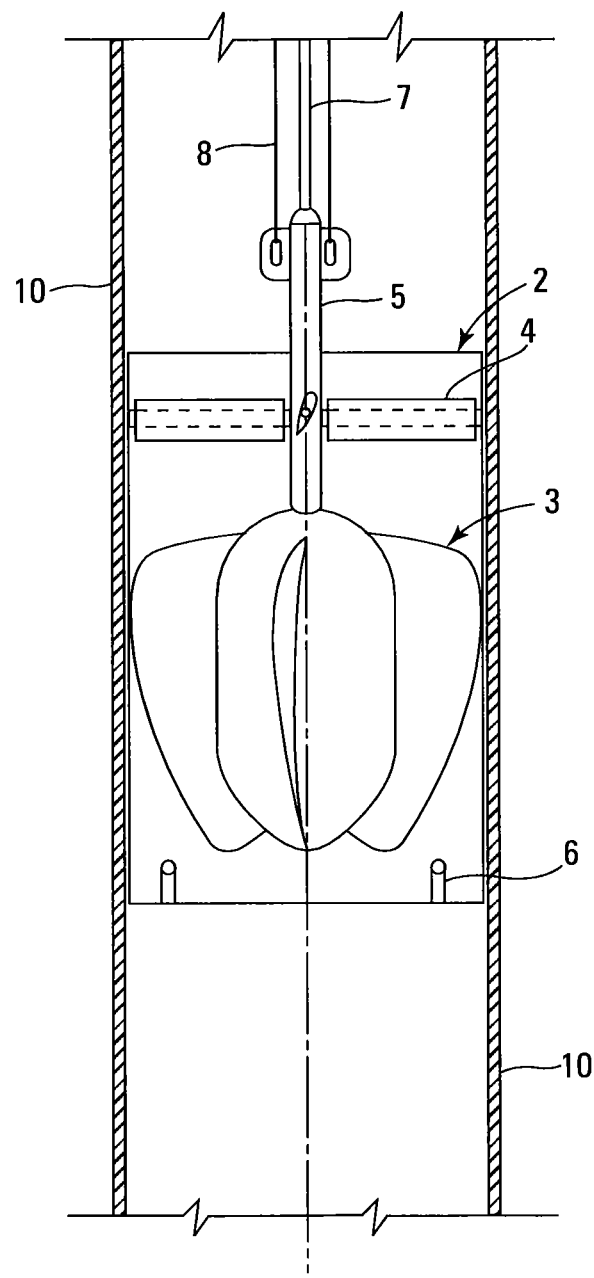
FIG. 3 is an elevational view diagram depicting an electrical generator module according to yet another embodiment installed in a vortex shaft.

FIG. 3 depicts an electrical generator module installed in a vortex shaft 10 according to another embodiment. As illustrated, the turbine is housed inside of the casing portion (not shown), which is inside of runner 3. The housing of runner 3 is bulb-shaped and has a form factor designed to fit inside the air core of the vortex shaft that would exist when the vortex drop structure is operating at its design flow.

The blades of runner 3 are situated length-wise along the outer surface of the bulb-shaped runner housing of the turbine. In this turbine design, the stator of the electrical generator is non-movably coupled to support pole 5, and support pole 5 is fixed to the cylindrical shell 2 by stay vanes 4.

Figure 4:
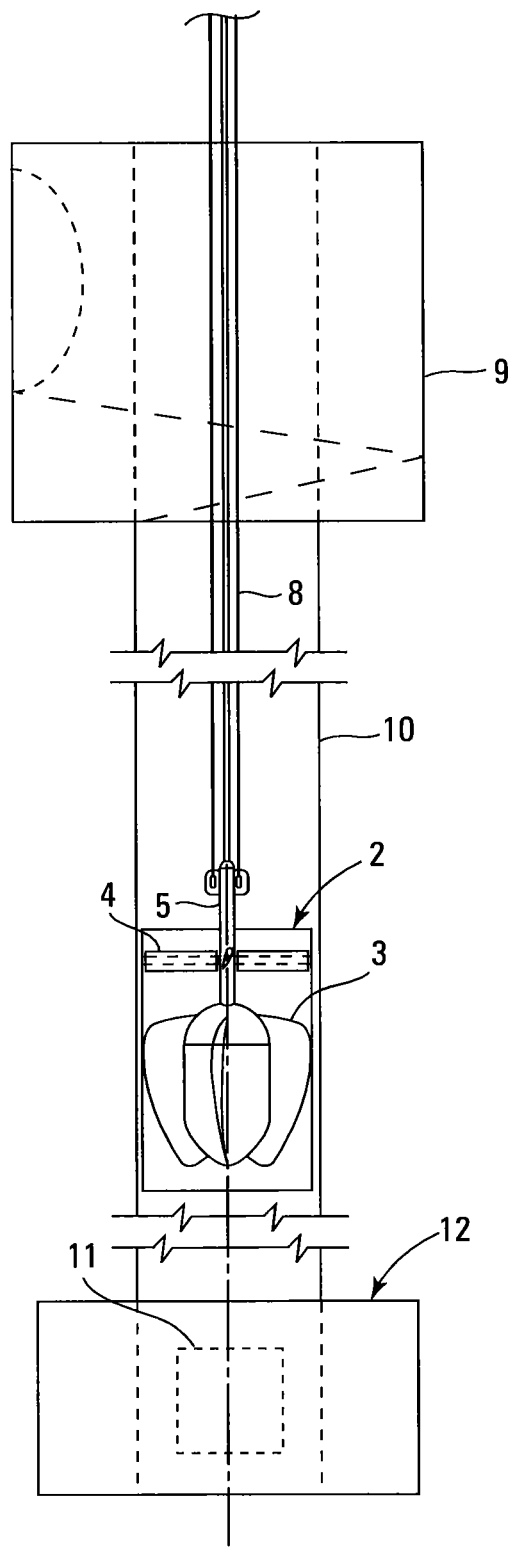
FIG. 4 is a diagram illustrating the electrical generator module of the type depicted in FIG. 3 as it would be installed in a vortex drop structure.

FIG. 4 illustrates the electrical generator module of the type depicted in FIG. 3 as it would be installed in a vortex drop structure having a vortex form 9, vortex shaft 10, a flow exit 11 from the vortex shaft, and an energy dissipating pool or reservoir 12. As illustrated, lifting cables 8 may be secured at a point (not shown) well above the top of the vortex form 9.

Figure 5:
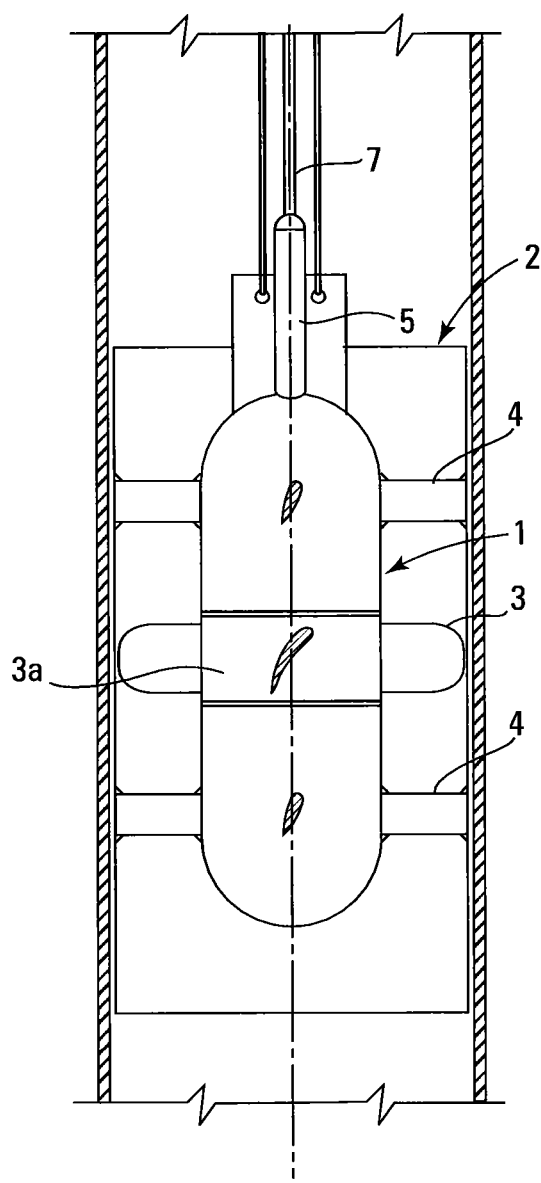
FIGS. 5-6 illustrate variants of another type of embodiment in which the turbine runner is positioned around the body of the turbine casing.
Figure 6:
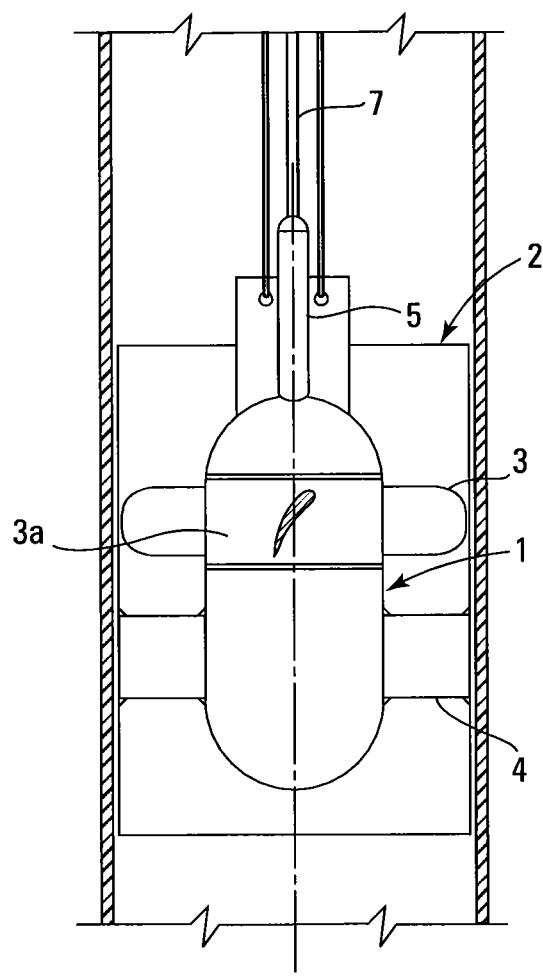

FIGS. 5-6 illustrate variants of another type of embodiment in which runner 3 is positioned around the body of turbine casing 1. Runner 3 is constructed with a ring portion 3a that is coupled to the rotor of the electrical generator, and that provides a generally contiguous bulb-shaped housing for turbine casing 1. In this embodiment, ring portion 3a provides a part of the enclosure surface for casing 1.

The embodiment of FIG. 6 differs from the embodiment of FIG. 5 in that runner 3 of FIG. 6 is situated toward the top of the turbine. This arrangement provides the runner's blades with a less-disturbed helical flow compared to the helical flow presented to the blades of the embodiment of FIG. 5, for instance, where the runner is situated lower, and where the presence of the body of turbine casing 1 presents an obstruction to the flow, thereby causing the disturbance.

In yet another variation, cylindrical shell 2 includes a ring bearing situated circumferentially along its interior surface that couples the outer edges of the propeller of runner 3 to the cylindrical shell. The ring bearing coupling between the propeller and cylindrical shell of this type of embodiment prevents the propeller from colliding with the interior of cylindrical shell 2, and permits the propeller blades to extend to the interior surface of cylindrical shell 2.

Figure 7:
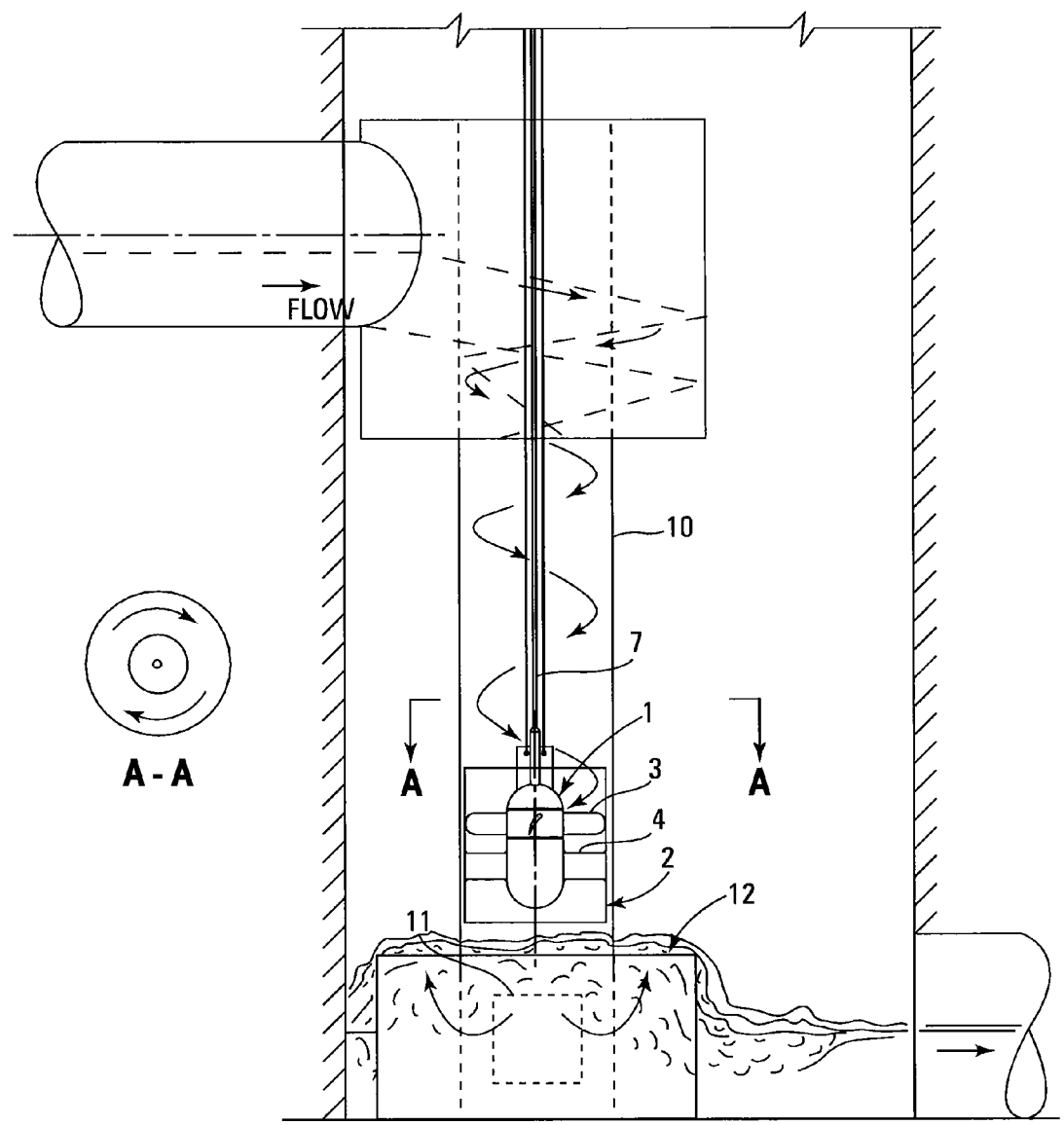
FIG. 7 illustrates an electrical generator module at elevation according to one embodiment installed in a working vortex drop structure, with the flow through the structure and electrical generator module being depicted by arrows, along with a cross-sectional view of the flow in-shaft.

FIG. 7 illustrates an electrical generator module according to one embodiment installed in a working vortex drop structure. The arrows depict water flowing through the vortex drop structure along a helically-spiraling path in the vortex shaft 10. In one type of installation, the electrical generator module is positioned at an elevation in which the flow maintains its integrity around a stable air core, while possessing the greatest kinetic energy, and while providing sufficient clearance for the flow as it exits at the top of the energy dissipating reservoir 12.

Figure 8:
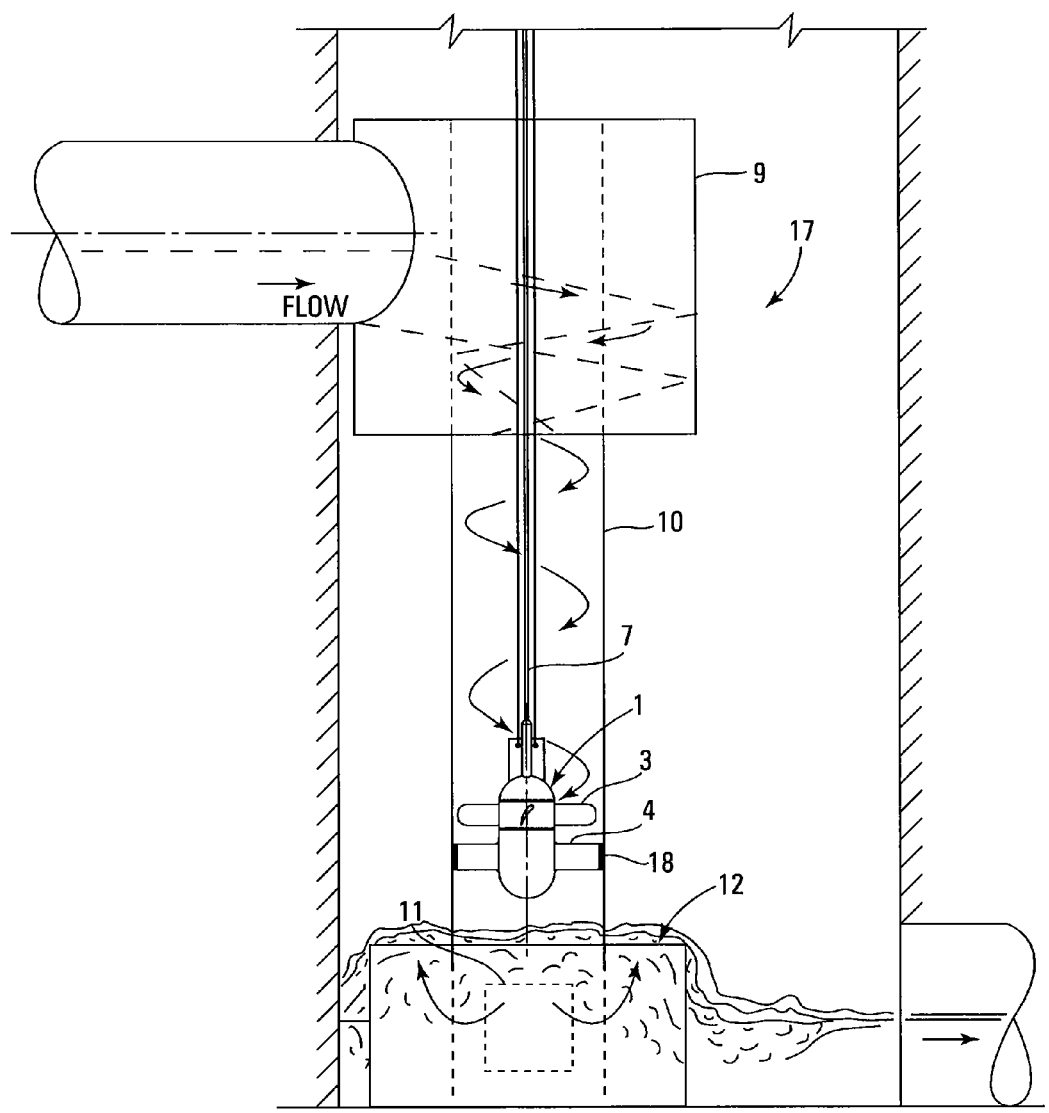
FIG. 8 illustrates a variation of the embodiment of FIG. 7, and features a vortex insert assembly with the electrical generator module being fixed to the wall of the vortex shaft.

FIG. 8 illustrates a variation of the embodiment of FIG. 7. In the embodiment of FIG. 8, the vortex drop structure is composed of a vortex insert assembly 17, which is a prefabricated unit that includes vortex form 9, energy dissipating reservoir 12, vortex shaft 10, an electrical generator module having turbine casing 1 (with the electrical generator inside), runner 3, and stay vanes 4. Cylindrical shell 2 is omitted in this embodiment, and is instead turbine casing 1 is attached to the wall of vortex shaft 10 via stay vanes 4, which have an attachment 18 to the vortex shaft wall. In various approaches to achieving the construction of attachment 18, stay vanes 4 may be welded, fastened (e.g., bolted, glued, etc.) or otherwise fixed to the wall of vortex shaft 10. In one type of embodiment of attachment 18, stay vanes 4 have fins that are each pivotably attached to a support member, which permits their angle to be adjusted during operation. The embodiment shown in FIG. 8 also does not require supporting cables or a support pole, since stay vanes 4 and attachment 18 are sufficiently strong to hold the weight of the electrical generator. In this embodiment, the electrical generator module cannot readily be removed while the vortex insert assembly is installed; however, since vortex insert assembly 17 is a prefabricated unit, access to the electrical generator module may be provided for maintenance purposes by removing vortex form 9, or by removing the entire vortex insert assembly 17.

Figure 9:
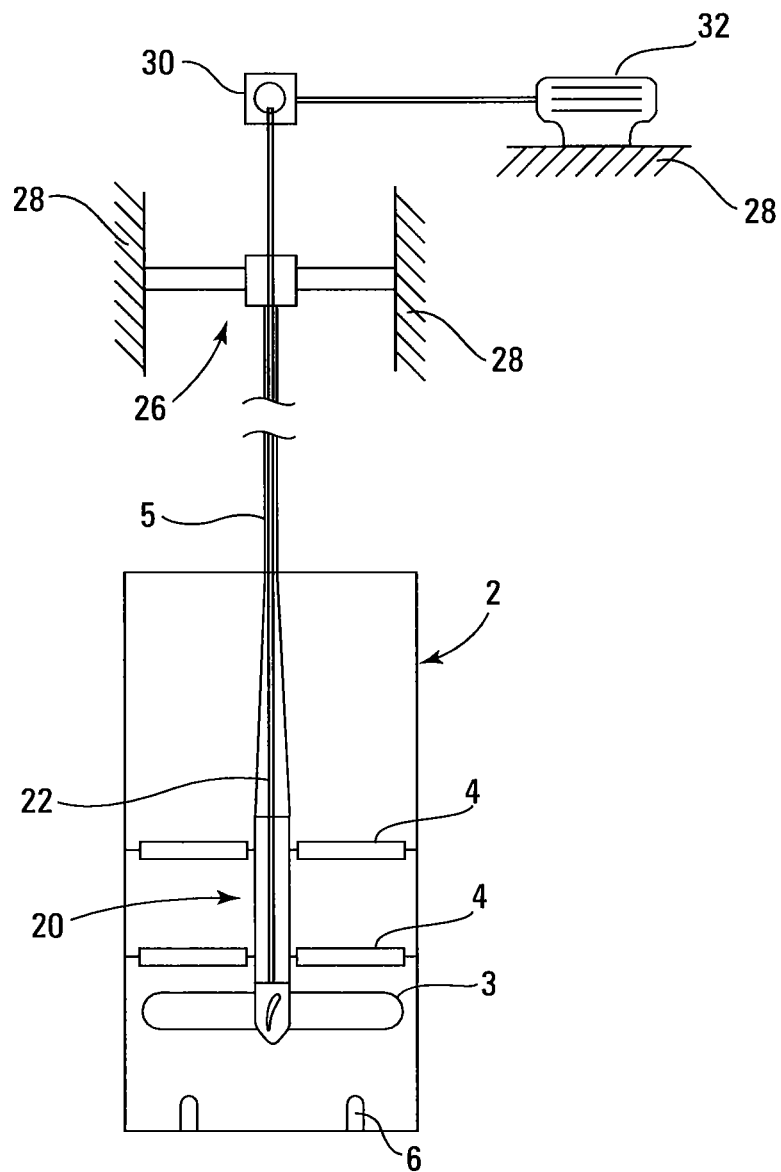
FIG. 9 is a diagram illustrating an embodiment of the invention in which the electrical generator module comprises a runner portion situated in the vortex shaft mechanically coupled to an electrical generator situated outside of the vortex shaft.

FIG. 9 is a diagram illustrating another type of embodiment, in which the electrical generator itself is not located within the vortex shaft, thereby leaving more room in the vortex shaft for a smaller air core (or for situations where there is no air core at all). In this embodiment, the components situated inside the vortex shaft are of significantly reduced complexity compared to the embodiments described above. Instead of a turbine casing, a casing portion 20 is rotationally coupled to runner 3, and fixed to cylindrical shell 2 via stay vanes 4. Casing portion 20 is supported by support pole 5, which is extended upwards and rigidly fixed to a permanent structure (e.g., concrete slab 28) via attachment mechanism 26. Alternatively, or in addition to support pole 5, cylindrical shell 2 may be supported by cables (not shown). As described in the embodiments above, cylindrical shell (and, in this embodiment, casing portion 20) are fixed so that they cannot rotate inside of the vortex shaft.

As shown in FIG. 9, runner 3 has propeller-shaped blades similar to those of the embodiments described above with reference to FIGS. 1-2 and 5-7. In a related embodiment (not shown), the blades are similar to those shown in FIGS. 3-4. In operation, power from the rotating runner 3 is transferred to electrical generator 32 via shaft 22. Shaft 22 may be situated within support pole 5 as illustrated, may have its own separate protective sheath, or may be without any covering or enclosure. In the embodiment shown, shaft 22 passes through or past attachment mechanism 26, and is ultimately coupled via linkage 30 to electrical generator 32, which is situated in a fixed location, such as on a concrete slab 28. A transmission mechanism may be incorporated as part of electrical generator 32, may be part of linkage 30, or may be situated within runner mount 20.

The embodiments detailed above are intended to be illustrative and not limiting. In addition, although aspects of the present invention have been described with reference to particular embodiments, those skilled in the art will recognize that changes can be made in form and detail without departing from the spirit and scope of the invention disclosed herein.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An electrical generator module for harnessing the energy of fluid flowing in a channel subject to gravitational and centripetal forces, the electrical generator module comprising:
    a cylindrical shell portion that facilitates installation of the electrical generator module within the flow channel, the cylindrical shell portion including a top end and a bottom end, the top end and bottom end each fitting within the interior of the flow channel, and wherein the cylindrical shell portion defines an interior space and includes a cylindrical exterior surface, the cylindrical exterior surface having a form factor corresponding to an interior surface of the flow channel;
    a stationary casing portion rigidly secured to the cylindrical shell portion and situated within the interior space defined by the cylindrical shell portion;
    a runner portion rotationally coupled to the stationary casing portion, the runner portion including a set of blades adapted to interact with the fluid;
    a support arrangement adapted to secure the cylindrical shell portion to the interior of the channel such that the cylindrical shell portion is prevented from rotating; and
    an electrical energy generator mechanically coupled to the runner portion and adapted to convert rotational motion of the runner portion into electrical energy.

2. The module of claim 1, wherein the stationary casing portion is constructed to have a form factor such that, in operation, the casing portion presents at most an insubstantial obstruction to flowing fluid in the channel, wherein an insubstantial obstruction is defined as an obstruction that causes a quantifiable loss of efficiency not exceeding 25% at a condition where the vortex drop structure is operating at its maximum design capacity.

3. The module of claim 1, wherein the support arrangement includes at least one cutout in the cylindrical shell portion, each of the at least one cutout being formed to engage with a structural support member protruding from an interior surface of the channel, wherein engagement of the at least one cutout and its corresponding structural support member provides lateral and torsional support for the cylindrical shell portion.

4. The module of claim 1, wherein the support arrangement further comprises at least one cable secured above the channel at one end, and mechanically coupled to the casing portion at another end, wherein the at least one cable provides axial support for the cylindrical shell portion.

5. The module of claim 1, wherein the support arrangement further comprises a support pole secured above the channel at one end, and mechanically coupled to the casing portion at another end, wherein the support pole provides axial and rotational support for the cylindrical shell portion.

6. The module of claim 1, wherein the stationary casing portion is rigidly secured to the cylindrical shell portion via stay vanes, each stay vane including a fin that is shaped and angled to avoid redirecting the flowing fluid.

7. The module of claim 6, wherein the fin is pivotally mounted to a support member and has freedom of pivotal movement to adjust to an incident angle of the flowing fluid.

8. The module of claim 1, wherein the stationary casing portion is rigidly secured to the cylindrical shell portion via stay vanes, each stay vane including a fin that is shaped and angled to redirect the flowing fluid to improve energy transfer from the flowing fluid to the blades of the runner portion.

9. The module of claim 1, wherein the stationary casing portion houses the electrical energy generator.

10. The module of claim 1, wherein the stationary casing portion is situated in an interior of the runner portion.

11. The module of claim 1, wherein the cylindrical shell portion includes a ring bearing situated circumferentially along an interior surface of the cylindrical shell portion, the ring bearing being coupled to the blades of the runner portion.

* * * * *